United States Patent
Stein

(10) Patent No.: US 7,909,019 B2
(45) Date of Patent: *Mar. 22, 2011

(54) DIRECT INJECTION ALCOHOL ENGINE WITH BOOST AND SPARK CONTROL

(75) Inventor: Robert A. Stein, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1258 days.

This patent is subject to a terminal disclaimer.

(21) Appl. No.: 11/464,172

(22) Filed: Aug. 11, 2006

(65) Prior Publication Data
US 2008/0035106 A1 Feb. 14, 2008

(51) Int. Cl.
*F02P 5/152* (2006.01)
(52) U.S. Cl. .................... 123/406.23; 123/304; 123/1 A
(58) Field of Classification Search .................. 123/1 A, 123/304, 575, 577, 406.31, 406.32, 294, 123/406.23
See application file for complete search history.

(56) References Cited

U.S. PATENT DOCUMENTS

| | | | |
|---|---|---|---|
| 2,221,405 A | 11/1940 | Nallinger | |
| 3,589,348 A | 6/1971 | Reichhelm | |
| 3,794,000 A | 2/1974 | Hodgkinson | |
| 4,031,864 A | 6/1977 | Crothers | |
| 4,136,652 A | 1/1979 | Lee | |
| 4,205,650 A | 6/1980 | Szwarcbier | |
| 4,256,075 A | 3/1981 | Fukui et al. | |
| 4,311,118 A | 1/1982 | Slagle | |
| 4,325,329 A | 4/1982 | Taylor | |
| 4,331,121 A | 5/1982 | Stokes | |
| 4,402,296 A | 9/1983 | Schwarz | |
| 4,411,243 A | 10/1983 | Hardenberg et al. | |
| 4,459,930 A | 7/1984 | Flory | |
| 4,480,616 A | 11/1984 | Takeda | |
| 4,489,596 A | 12/1984 | Linder et al. | |
| 4,502,453 A | 3/1985 | Kabasin et al. | |
| 4,590,904 A | 5/1986 | Wannenwetsch | |
| 4,648,367 A | 3/1987 | Gillbrand et al. | |
| 4,706,630 A | 11/1987 | Wineland et al. | |
| 4,810,929 A | 3/1989 | Strumbos | |
| 4,817,576 A | 4/1989 | Abe et al. | |
| 4,930,537 A | 6/1990 | Farmer | |
| 4,945,881 A | 8/1990 | Gonze et al. | |

(Continued)

FOREIGN PATENT DOCUMENTS

EP 1057988 1/2006

(Continued)

OTHER PUBLICATIONS

Stephen Russ, "A Review of the Effect of Engine Operating Conditions on Borderline Knock", SAE Technical Paper Series 960497, Feb. 26-29, 1996.

(Continued)

*Primary Examiner* — Erick Solis
(74) *Attorney, Agent, or Firm* — Allan J. Lippa; Alleman Hall McCoy Russell & Tuttle LLP

(57) ABSTRACT

Boosted engine operation and spark timing of an engine may be adjusted with alcohol content of the fuel in a direct injection engine. Further, various adjustments may be performed in numerous related systems to account for increased maximum engine torque, such as traction control, transmission shifting, etc.

13 Claims, 9 Drawing Sheets

U.S. PATENT DOCUMENTS

| | | | |
|---|---|---|---|
| 4,962,789 A | 10/1990 | Benscoter | |
| 4,993,386 A * | 2/1991 | Ozasa et al. | 123/25 J |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,050,555 A * | 9/1991 | Mitsumoto | 123/406.31 |
| 5,056,490 A | 10/1991 | Kashima | |
| 5,056,494 A | 10/1991 | Kayanuma | |
| 5,060,610 A | 10/1991 | Paro | |
| 5,111,795 A | 5/1992 | Thompson | |
| 5,131,228 A | 7/1992 | Mochizuki et al. | |
| 5,188,087 A | 2/1993 | Saito | |
| 5,204,630 A | 4/1993 | Seitz et al. | |
| 5,230,309 A | 7/1993 | Suga et al. | |
| 5,233,944 A * | 8/1993 | Mochizuki | 123/1 A |
| 5,335,637 A | 8/1994 | Davis et al. | |
| 5,336,396 A | 8/1994 | Shetley | |
| 5,357,908 A | 10/1994 | Sung et al. | |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzalez | |
| 5,477,836 A | 12/1995 | Hyodo et al. | |
| 5,508,582 A | 4/1996 | Sugimoto et al. | |
| 5,565,157 A | 10/1996 | Sugimoto et al. | |
| 5,694,908 A | 12/1997 | Hsu | |
| 5,740,784 A | 4/1998 | McKinney | |
| 5,782,092 A | 7/1998 | Schultalbers et al. | |
| 5,806,500 A | 9/1998 | Fargo et al. | |
| 5,875,743 A | 3/1999 | Dickey | |
| 5,887,566 A | 3/1999 | Glauber et al. | |
| 5,921,222 A | 7/1999 | Freeland | |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,213,086 B1 | 4/2001 | Chmela et al. | |
| 6,229,253 B1 | 5/2001 | Iwata et al. | |
| 6,234,123 B1 | 5/2001 | Iiyama et al. | |
| 6,318,083 B1 | 11/2001 | Machida et al. | |
| 6,325,039 B1 | 12/2001 | Goto | |
| 6,382,225 B1 | 5/2002 | Tipton | |
| 6,494,192 B1 | 12/2002 | Capshaw et al. | |
| 6,502,543 B1 | 1/2003 | Arai et al. | |
| 6,505,579 B1 | 1/2003 | Lee | |
| 6,553,974 B1 | 4/2003 | Wickman et al. | |
| 6,617,769 B2 | 9/2003 | Suzuki | |
| 6,619,242 B2 | 9/2003 | Kaneko | |
| 6,622,664 B2 | 9/2003 | Holder et al. | |
| 6,622,690 B2 | 9/2003 | Ando et al. | |
| 6,651,432 B1 | 11/2003 | Gray, Jr. | |
| 6,655,324 B2 * | 12/2003 | Cohn et al. | 123/1 A |
| 6,659,068 B2 | 12/2003 | Urushihara et al. | |
| 6,684,849 B2 * | 2/2004 | zur Loye et al. | 123/295 |
| 6,691,669 B2 | 2/2004 | Surnilla et al. | |
| 6,698,387 B1 | 3/2004 | McFarland et al. | |
| 6,711,893 B2 | 3/2004 | Ueda et al. | |
| 6,792,966 B2 | 9/2004 | Harvey | |
| 6,845,616 B2 | 1/2005 | Jauss | |
| 6,866,012 B2 | 3/2005 | Hayase et al. | |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 | 12/2005 | Partridge et al. | |
| 6,978,762 B2 | 12/2005 | Mori | |
| 6,988,485 B2 | 1/2006 | Ichise et al. | |
| 6,990,956 B2 | 1/2006 | Niimi | |
| 7,055,500 B2 | 6/2006 | Miyashita et al. | |
| 7,082,926 B2 | 8/2006 | Sadakane et al. | |
| 7,159,568 B1 | 1/2007 | Lewis et al. | |
| 7,178,503 B1 * | 2/2007 | Brehob | 123/304 |
| 7,225,787 B2 * | 6/2007 | Bromberg et al. | 123/198 A |
| 7,255,080 B1 | 8/2007 | Leone | |
| 7,261,064 B2 | 8/2007 | Bhaishora et al. | |
| 7,287,492 B2 | 10/2007 | Leone et al. | |
| 7,287,509 B1 | 10/2007 | Brehob | |
| 7,293,552 B2 | 11/2007 | Leone et al. | |
| 7,426,908 B2 | 9/2008 | Brehob | |
| 7,444,987 B2 * | 11/2008 | Cohn et al. | 123/431 |
| 7,454,285 B2 * | 11/2008 | Christie et al. | 701/105 |
| 7,640,913 B2 * | 1/2010 | Blumberg et al. | 123/304 |
| 2001/0035215 A1 | 11/2001 | Tipton et al. | |
| 2002/0139321 A1 * | 10/2002 | Weissman et al. | 123/1 A |
| 2003/0089337 A1 | 5/2003 | Cohn et al. | |
| 2003/0127072 A1 | 7/2003 | Gmelin et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0250790 A1 | 12/2004 | Heywood et al. | |
| 2004/0261763 A1 | 12/2004 | Hashimoto et al. | |
| 2005/0051135 A1 | 3/2005 | Tomada et al. | |
| 2005/0056264 A1 * | 3/2005 | Weissman et al. | 123/577 |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109316 A1 * | 5/2005 | Oda | 123/406.29 |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2006/0180099 A1 | 8/2006 | Aimoto et al. | |
| 2006/0191727 A1 | 8/2006 | Usami | |
| 2007/0028861 A1 | 2/2007 | Kamio | |
| 2007/0028905 A1 | 2/2007 | Shinagawa et al. | |
| 2007/0034192 A1 | 2/2007 | Kamio | |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119411 A1 | 5/2007 | Kerns | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 | 5/2007 | Lewis et al. | |
| 2007/0119425 A1 | 5/2007 | Lewis et al. | |
| 2007/0204813 A1 | 9/2007 | Arai et al. | |
| 2007/0215069 A1 | 9/2007 | Leone | |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215110 A1 | 9/2007 | Stein et al. | |
| 2007/0215111 A1 | 9/2007 | Surnilla | |
| 2007/0215125 A1 | 9/2007 | Dearth et al. | |
| 2007/0215127 A1 | 9/2007 | Dearth et al. | |
| 2007/0215130 A1 | 9/2007 | Shelby et al. | |
| 2007/0219674 A1 | 9/2007 | Leone | |
| 2007/0219701 A1 | 9/2007 | Hashimoto et al. | |
| 2007/0221163 A1 | 9/2007 | Kamio | |
| 2007/0234976 A1 | 10/2007 | Dearth et al. | |

FOREIGN PATENT DOCUMENTS

| | | |
|---|---|---|
| JP | 61065066 | 4/1986 |
| JP | 2007/056754 | 3/2007 |
| WO | WO 2004/097198 | 11/2004 |
| WO | WO 2006/055540 | 5/2006 |
| WO | WO 2007/106354 | 9/2007 |
| WO | WO 2007/106416 | 9/2007 |

OTHER PUBLICATIONS

S. Brusca et al., "Water Injection in IC-SI Engines to Control Detonation and to Reduce Pollutant Emissions", SAE Technical Paper No. 2003-01-1912, May 19-22, 2003.

D.R. Cohn et al., "Direct Injection Ethanol Boosted Gasoline: Biofuel Leveraging for Cost Effective Reduction of Oil Dependence and CO2 Emissions", Mar. 15, 2005, Massachusetts Institute of Technology.

L. Bromberg et al., "Calculations of Knock Suppression in Highly Turbocharged Gasoline/Ethanol Engines Using Direct Ethanol Injection", Jul. 7, 2005, Massachusetts Institute of Technology.

U.S. Appl. No. 60/780,319, filed Mar. 8, 2006, Bromberg et al.
U.S. Appl. No. 11/682,372, filed Mar. 6, 2007, Bromberg et al.
U.S. Appl. No. 60/832,836, filed Jul. 24, 2006, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/566,131, filed Dec. 1, 2006, Blumberg et al.
U.S. Appl. No. 11/776,120, filed Jul. 11, 2007, Stein et al.
U.S. Appl. No. 11/846,373, filed Aug. 25, 2007, Leone et al.
U.S. Appl. No. 11/851,116, filed Sep. 6, 2007, Kerns.
U.S. Appl. No. 11/923,418, filed Oct. 24, 2007, Leone et al.
U.S. Appl. No. 11/924,395, filed Oct. 25, 2007, Brehob.

Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.

Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

* cited by examiner

DIRECT INJECTION ALCOHOL ENGINE WITH BOOST AND SPARK CONTROL

BACKGROUND AND SUMMARY

Various fuels have been identified to mitigate the rising price of energy and environmental concerns. For example, alcohol has been recognized as an attractive alternative source of energy, and more particularly a fuel for automotive applications. Various engine systems may be used with alcohol fuels, utilizing various engine technologies such as turbo-chargers, super-chargers, etc. Further, various approaches may be used to control alcohol-fuelled engines with such devices, including adjustment of boost or spark timing in dependence upon an alcohol content of the engine fuel, and various operating conditions.

The inventors herein have recognized several interrelated issues with alcohol-fuelled engines involving the fuel delivery system, and found that it is possible to operate the engine system to achieve improved engine performance with an alcohol fuel or blend by varying the amounts, timing, and number of injections.

In one example, an engine system is provided for an engine having at least a cylinder and combusting a fuel, the system comprising: a direct injection fuel injector coupled to the cylinder; an intake charge boosting device coupled to the engine and fluidly coupled to the cylinder; and a control system for varying at least a spark timing of the cylinder and boost amount of said device as an alcohol content of the directly injected fuel varies, said system operating the engine to produce increased peak torque output when said alcohol content is increased, at least during one condition.

In this way, it is possible to utilize direct injection and boosting, along with an appropriate boost, spark, and fuel control system, to take advantage of increased charge cooling effects via alcohol's increased heat of vaporization and increased octane to provide an engine with improved peak torque output. In one particular example, peak engine torque, at least for some conditions, can be increased when using a fuel with increased alcohol compared to another fuel with less alcohol content. Such performance can be achieved using the above approach, even though the fuel with increased alcohol may have a reduced energy density.

As such, a customer can be encouraged, rather than discouraged, to utilize alternative fuels as such use can proved improved engine performance. The improved performance can provide various benefits, such as improved towing capacity, improved acceleration, and/or various others.

Further, use of such alternative fuels may also provide reduced emissions and various other environmental and/or economic advantages. For example, use of direct injection fuel can reduce the effect of varying amounts of alcohol on intake system puddling. The improved air-fuel ratio control can then be used to further reduce the likelihood of knock by providing more appropriate spark timing.

In another aspect, improved marketing and/or advertising may be achieved. For example, it may be possible to inform potential consumers that a vehicle having an engine (with one or more of the features described herein) may be able to obtain improved vehicle performance when using a fuel with increased alcohol, rather than simply maintaining performance or achieving degraded performance.

DETAILED DESCRIPTION

Figure 1:
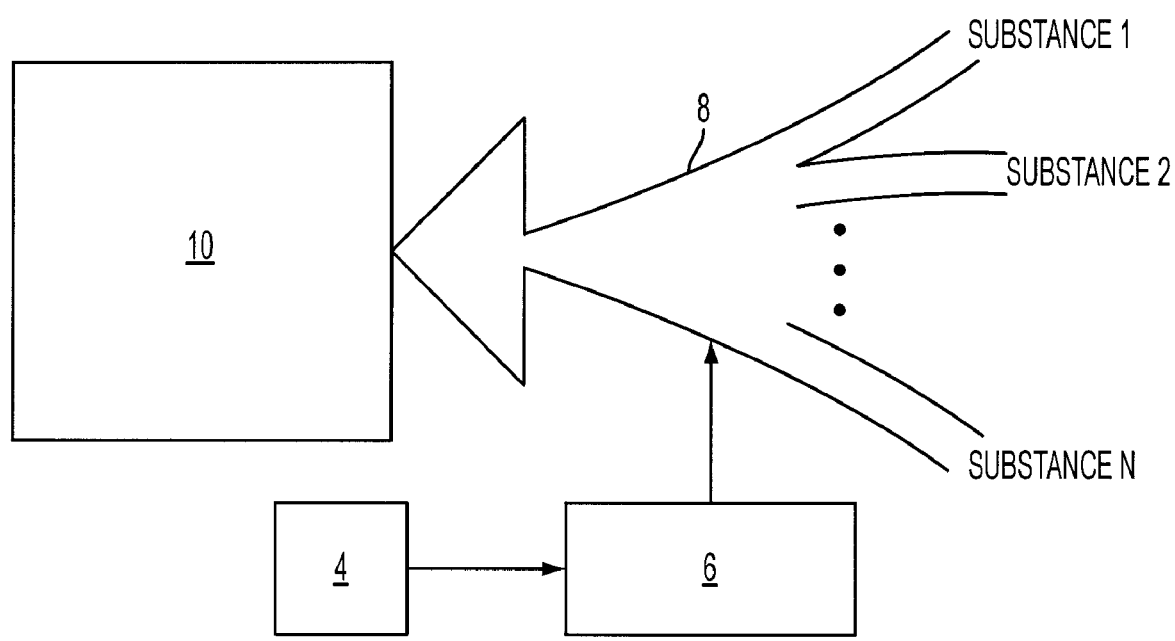
FIG. 1 shows a generic engine system.

FIG. 1 shows an engine 10 receiving delivery of a plurality of substances (1, 2, . . . , N) as indicated by arrow 8. The various substances may include multiple different fuel blends or other alternatives. In one example, multiple different substances having different gasoline and/or alcohol and/or water concentrations may be delivered to the engine, and may be delivered in a mixed state, or separately delivered. Further, the relative amounts and/or ratios of the different substances provided to the engine may be controlled by a controller 6 in response to operating conditions, which may be provided by and/or inferred via sensor(s) 4. Alternatively, or under some conditions, the relative amounts and/or ratios may be determined by the fuel blend added to the vehicle by the customer, and thus may not significantly vary during operation.

In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc as a second substance. In still another example, the first substance may be a gasoline alcohol blend with a lower alcohol concentration than a gasoline alcohol blend of a second substance.

In one embodiment, when using both gasoline and a fuel having alcohol (e.g., ethanol), it may be possible to adjust operating conditions to take advantage of the increased charge cooling of alcohol fuels (e.g., via direct injection) to provide improved engine performance, because of the different properties of alcohol. This phenomenon, combined with increased compression ratio, and/or boosting and/or engine downsizing, can then be used to obtain fuel economy benefits (by reducing the knock limitations on the engine), while also allowing engine operation with improved engine output torque, for example.

Figure 2:
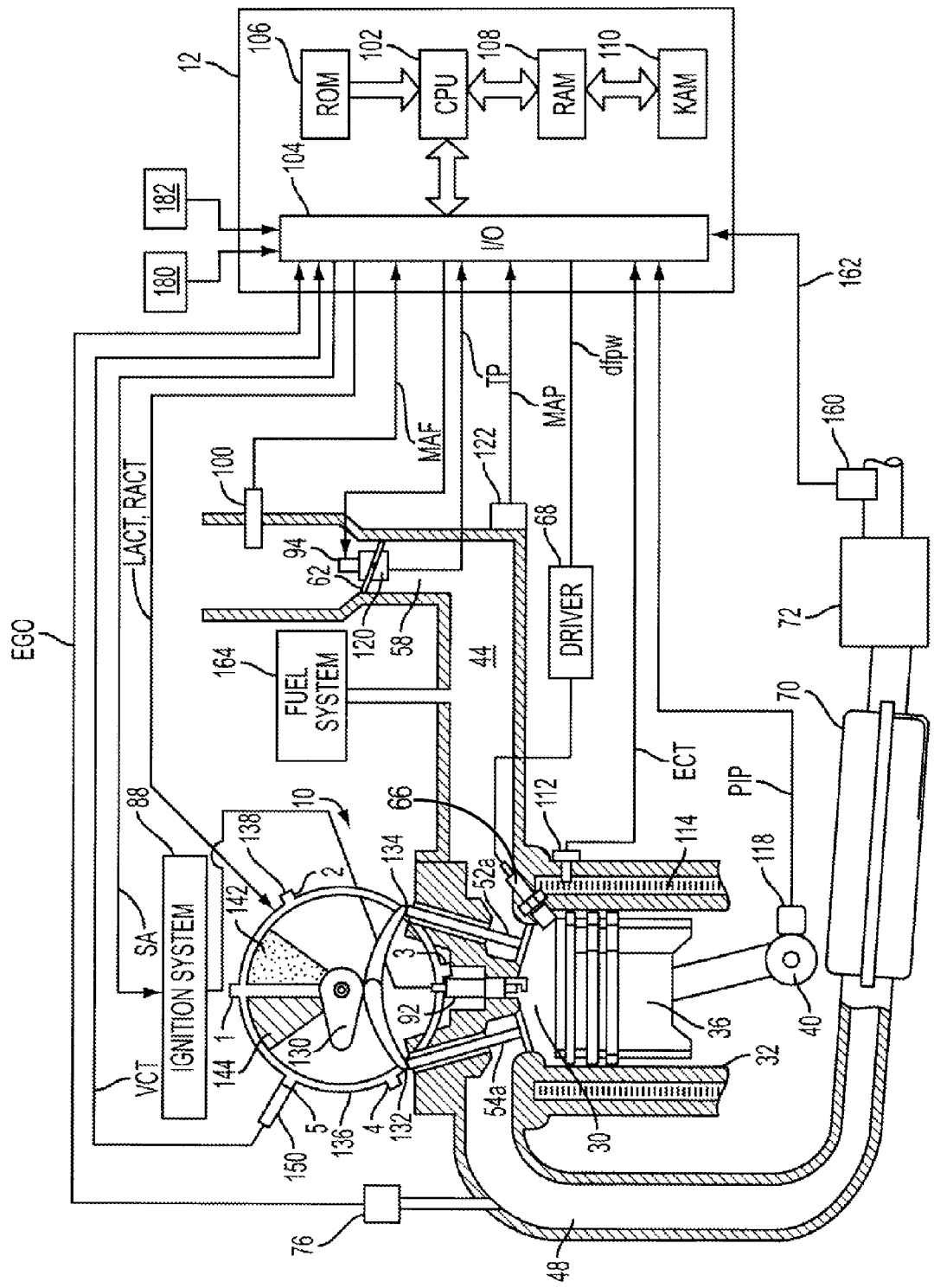
FIG. 2 shows a partial engine view.

Referring now to FIG. 2, one cylinder of a multi-cylinder engine, as well as the intake and exhaust path connected to that cylinder, is shown. In the embodiment shown in FIG. 2, engine 10 uses a direct injector 66. Further, engine 10 is capable of using a plurality of different fuel blends. For example, engine 10 may use a mixture of gasoline and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gas), etc. Direct injector 66 may be used to inject a mixture of gasoline and an alcohol based fuel, where the ratio of the two fuel quantities in the mixture may be adjusted by controller 12 via a mixing valve, for example. In another embodiment, different sized injectors and different fuels may be used.

Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 has an associated compression ratio, which is the ratio of volumes when piston 36 is at bottom center and top center. Conventionally, the compression ratio is in the range of 9:1 to 10:1 However, when higher octane fuels, fuels with a higher latent enthalpy of vaporization, and/or direct injection is used, the compression ratio can be raised due to the mitigating effects that octane, latent enthalpy of vaporization, and direct injection have on knock.

Fuel injector 66 is shown directly coupled to combustion chamber 30 for delivering injected fuel directly therein in proportion to the pulse width of signal dfpw received from controller 12 via electronic driver 68. While FIG. 2 shows injector 66 as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing. Additional fuel injectors may also be used.

Fuel and/or water may be delivered to fuel injector 66 by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel line may have a pressure transducer providing a signal to controller 12.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway. In the latter alternative, throttle plate 62 is actuated by the operator of the vehicle, the cable, or other device, between the accelerator pedal and the throttle valve not shown.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric, homogeneous mode of operation.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. In one example, stratified layers may be formed by operating injector 66 during a compression stroke. In another example, a homogenous mixture may be formed by operating injector 66 during an intake stroke (which may be open valve injection). In still other examples, multiple injections from injector 66 may be used during one or more strokes (e.g., intake and/or compression). In some examples, a combination of a stratified and homogenous mixtures may be formed in the chamber. Even further examples may include the use of different injection timings and mixture formations under different conditions, as described below.

Controller 12 can adjust the amount of fuel delivered by fuel injector 66 so that the homogeneous or stratified air/fuel mixtures or combinations thereof formed in chamber 30 can be selected to be at stoichiometry, a value rich of stoichiometry, or a value lean of stoichiometry.

Emission control device 72 is shown positioned downstream of catalytic converter 70. Emission control device 72 may be a three-way catalyst, particulate filter, NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute manifold pressure signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is mechanically coupled to crankshaft 40 via a timing chain or belt (not shown). Therefore, housing 136 and camshaft 130 can rotate at a speed substantially equivalent to ½ of the speed of the crankshaft, or other suitable speed. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide a plurality (usually two) cam profiles which can be selected based on operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and it is understood that each cylinder has its own set of intake/exhaust valves, fuel injectors, spark plugs, etc.

Figure 3:
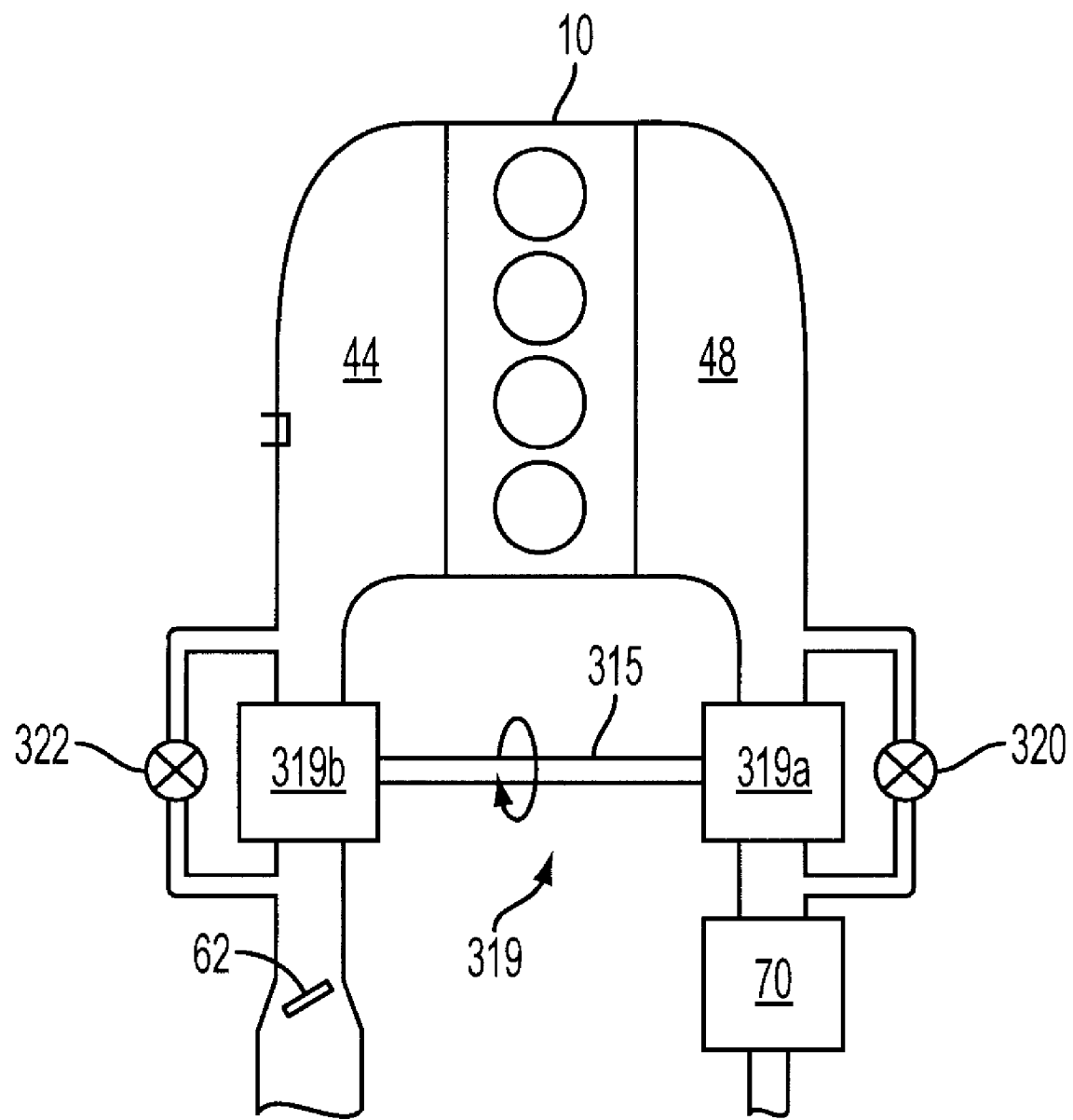
FIG. 3 shows an engine with a turbocharger.

While not shown in FIG. 2, engine 10 may be coupled to various boosting devices, such as a supercharger or turbocharger, as shown in FIG. 3. On a boosted engine, desired torque may also be maintained by adjusting wastegate and/or compressor bypass valves.

Referring now specifically to FIG. 3, an example engine 10 is shown with four in-line cylinders. In one embodiment, engine 10 may have a turbocharger 319, which has a turbine 319a coupled to the exhaust manifold 48 and a compressor 319b coupled to the intake manifold 44. While FIG. 3 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be controlled via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a mechanically or electrically driven supercharger may be used, if desired.

Figure 4:
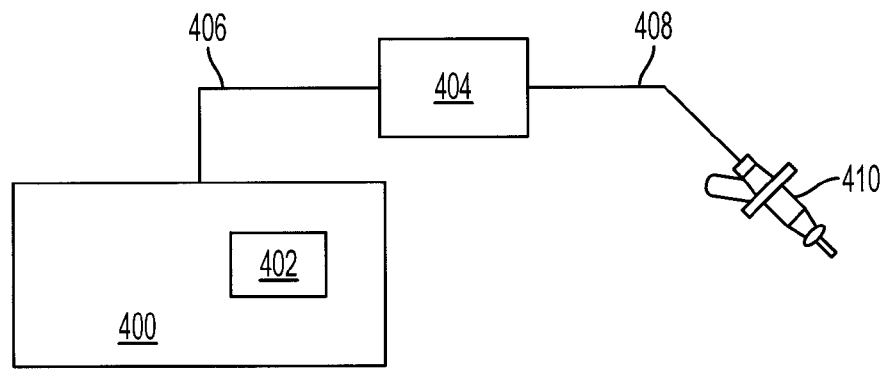
FIG. 4 shows example fuel tank and pump configurations.

Referring now to FIG. 4, an example fuel delivery system is shown for an example with a single injector, where the single injector is a direct injector. In this example, a fuel tank 400 is shown for holding a fuel, such as gasoline and an alcohol blend. The fuel tank has an internal fuel pump 402, where the internal fuel pump is a lower pressure fuel pump. A fuel pump 404 is coupled to the lower pressure fuel pump 402 by fuel line 406, where the fuel pump is a higher pressure fuel pump. Higher pressure external fuel pump 404 is coupled to a fuel rail 408 having fuel injectors 410 coupled thereto. As noted herein, the fuel pressure at the injector may be adjusted by adjusting parameters such as the pump operation of one of pumps 402 and/or 404, for example.

Figure 5A:
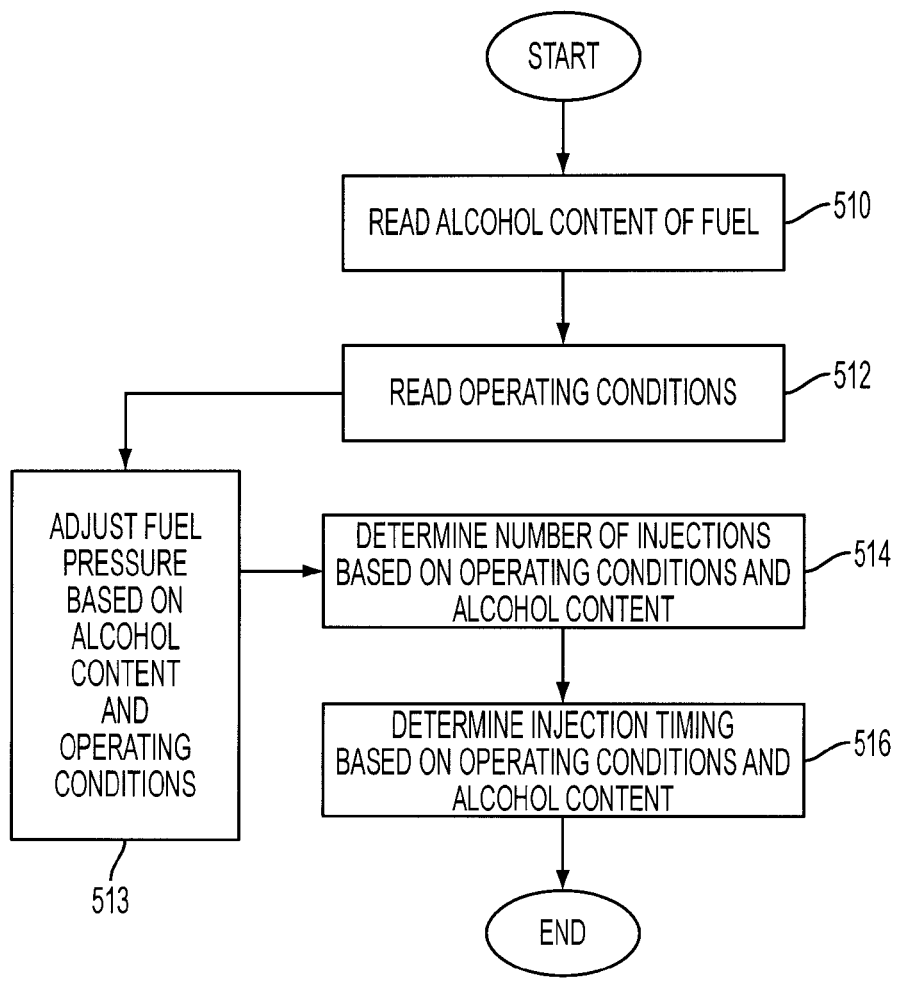
FIG. 5 shows a graph illustrating example injection timing operation.

Referring now to FIG. 5A, a routine is described for adjusting fuel injection parameters taking into account an amount of alcohol in the fuel system. In 510, the routine reads an alcohol content of the fuel. The alcohol content of the fuel may be a percent alcohol, mass ratio of alcohol, volume ratio of alcohol, an amount of oxygen in the fuel, or various other indications of an amount of alcohol in the fuel. The indication may be provided via an alcohol sensor, or may be generated from an estimate based on operating conditions, or combinations thereof. An estimate of alcohol content of the fuel may be formed using feedback from an exhaust gas sensor, in addition to other parameters, such as, for example, a mass airflow amount, a fuel injection pulsewidth, a manifold pressure, and/or others.

Continuing with FIG. 5A, in 512, the routine reads other operating conditions that may be used to adjust fuel injection timings and/or amounts, such as, for example, engine coolant temperature, feedback from a knock sensor, cylinder air amount, manifold pressure, air charge temperature, manifold temperature, desired air-fuel ratio, spark timing, atmospheric pressure, and/or various other parameters.

Then, in 513, the routine determines whether to adjust, and if so does adjust, fuel injection pressure based on a desired engine output torque and engine speed given the alcohol content of the fuel. Because alcohols are partially oxygenated, (ethanol is $CH_5OH$, for example), they liberate a lesser amount of energy (lower heating value) when oxidized during combustion than a non-oxygenated hydrocarbon, like gasoline. The mass of fuel injected is increased as a function of alcohol content to provide the same combustion energy as gasoline, which requires a greater dynamic range from the fuel system. The pulse width may be adjusted to provide the desired amount of fuel. However, to handle a wide variety of fuels, including those with high alcohol content, the providing a greater amount of fuel by merely increasing the pulse width may be insufficient with the additional constraint of maintaining acceptable pulse-to-pulse repeatability at low fuel demand conditions. It is possible to address dynamic range issues with direct injection when alcohol content of the fuel varies by varying the fuel supply pressure with higher pressures at higher speed and/or torque conditions and lower pressures at lower speed and/or torque conditions.

Continuing with FIG. 5A, in 514, the routine determines a number of injections per engine cycle to be performed based on conditions and the amount of alcohol in the fuel. For example, as the amount of alcohol in the fuel increases, a greater or lesser number of injections for a given operating condition (e.g., a given speed/load condition) may be selected. Also, in the case of multiple injections per power cycle, a greater fraction of fuel may injected in an earlier injection as alcohol content increases so that there is more time for vaporization.

Then, in 516, the routine determines an injection timing (or timings in the case of multiple injections per cycle) based on conditions and the alcohol amount of the fuel. For example, injection timing of one or more injections may be advanced with increased alcohol in the fuel to take advantage of higher latent enthalpy of vaporization of alcohol to allow more time for vaporization. In one example, the injection timing may be advanced as a function of alcohol content and also the nature of the alcohol (e.g., ethanol vs. methanol). More injection timing advance may be used for methanol than ethanol because of its relatively higher latent enthalpy of vaporization, for example. Also, the timing of the injections may be adjusted based on the number of injections. In another example, injection timing may be advanced toward the period where there is pushback into the intake as a function of alcohol content. In this way, vaporization of the alcohol fuel can be aided by passing by the intake valve (twice, out and in). By cooling the intake system in this way, the charge density rammed into the combustion chamber can be increased thereby improving peak torque output of the engine. As such, injection timing may be adjusted based on engine torque and alcohol content to improve engine output.

Note that other engine control adjustments may be made based on alcohol content of the fuel, such as spark timing, boosting, and/or various others. In one example, the controller may increase boost on a variable geometry turbocharger (or via wastegate control) as a function of the increased octane in fuel due to the alcohol content. Due to direct injection into the cylinder, the cooling effect of the vaporization of the fuel occurs in the cylinder. This can increase the cooling compared to port injection and allows a greater boost without incurring knock.

In another example, the controller may adjust valve timing to increase valve overlap and inject fuel having alcohol at least partially during the valve overlap period to enhance the charge cooling effect with increased alcohol in the fuel. For example, intake valve timing may be advanced and/or exhaust valve timing may be retarded as will be described below with reference to FIG. 5B, for example.

Further still, ignition timing and/or valve timing may also be adjusted in response to an alcohol amount of the fuel.

Figure 5B:
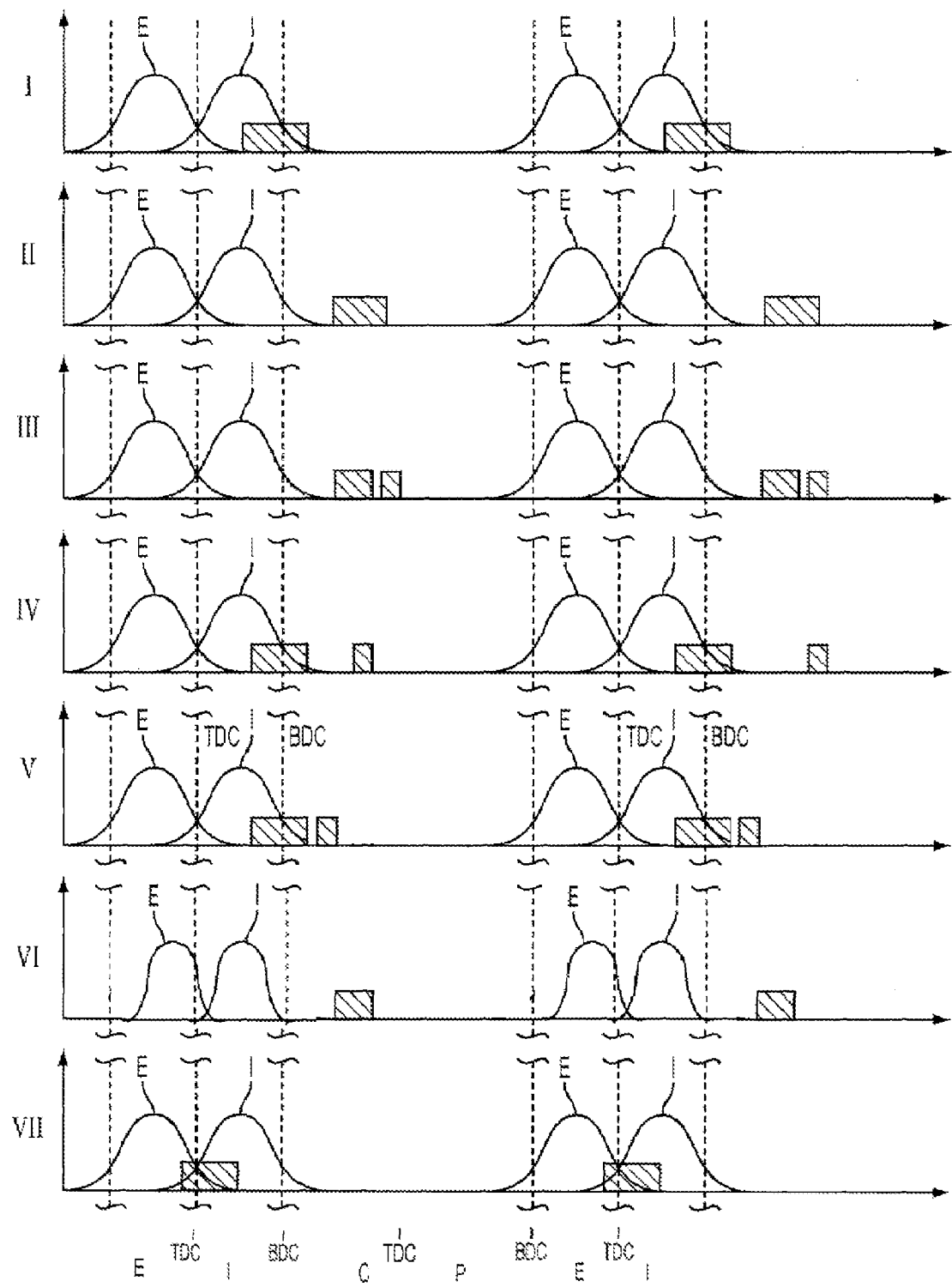

Various examples of variable injection timing and number of injections per cycle are illustrated in FIG. 5B, where the dashed vertical lines indicate intake valve opening and intake valve closing. As one example, the intake valve opening duration may be approximately 248° and the exhaust valve opening duration may be approximately 240°, wherein the intake valve is opened at approximately 10° before top dead center of the intake stroke and the intake valve is closed at approximately 58° after bottom dead center of the intake stroke, and the exhaust valve is opened at approximately 50° before bottom dead center of the expansion stroke and the exhaust valve is closed at approximately 10° after top dead center of the intake stroke. It should be appreciated that the above valve control scenario is just one example and that other suitable valve timings may be used. Various parameters may affect the adjustments shown between the graphs of FIG. 5B, as noted herein, including an alcohol amount of the fuel and/or other operating parameters such as alcohol type, fuel injection timing, number of fuel injection pulses, fuel injection supply pressure, boosting, knock detection, temperature, engine starting, or others.

In the first graph (I), a single injection is shown occurring partially during the intake stroke and ending after the close of the intake valve. The injection occurs partially during an open intake valve. In this example, the injection is advanced compared to the injection timing in the second graph (II), which shows both a shorter duration of fuel injection, and a later timing during a compression stroke. The shorter duration may be to compensate for an increased energy density and lower alcohol content, for example. The third graph (III) shows multiple injections (two) during the cycle, both during the compression stroke. However, based on alcohol content and/or other parameters, injections may occur during the intake stroke as well as during the compression stroke as shown by the fourth graph (IV). Further, as shown by comparing the third and fourth graphs, the relative amount of the injections may be adjusted based on alcohol content of the fuel and/or other parameters. Also, the fifth graph (V) illustrates how changes in alcohol content of the fuel can affect the duration between injections as well.

The sixth graph (VI) illustrates an example of variable timing, relative amounts of injection, and timing between injections, being varied in response to parameters such as alcohol content of the fuel. Finally, the last graph (VII) illustrates injection timing using pushback effects with valve overlap. As noted above, such operation may be used to further take advantage of charge cooling/vaporization effects with increased alcohol content in the fuel to increase torque of the engine while reducing knock effects.

Figure 6:
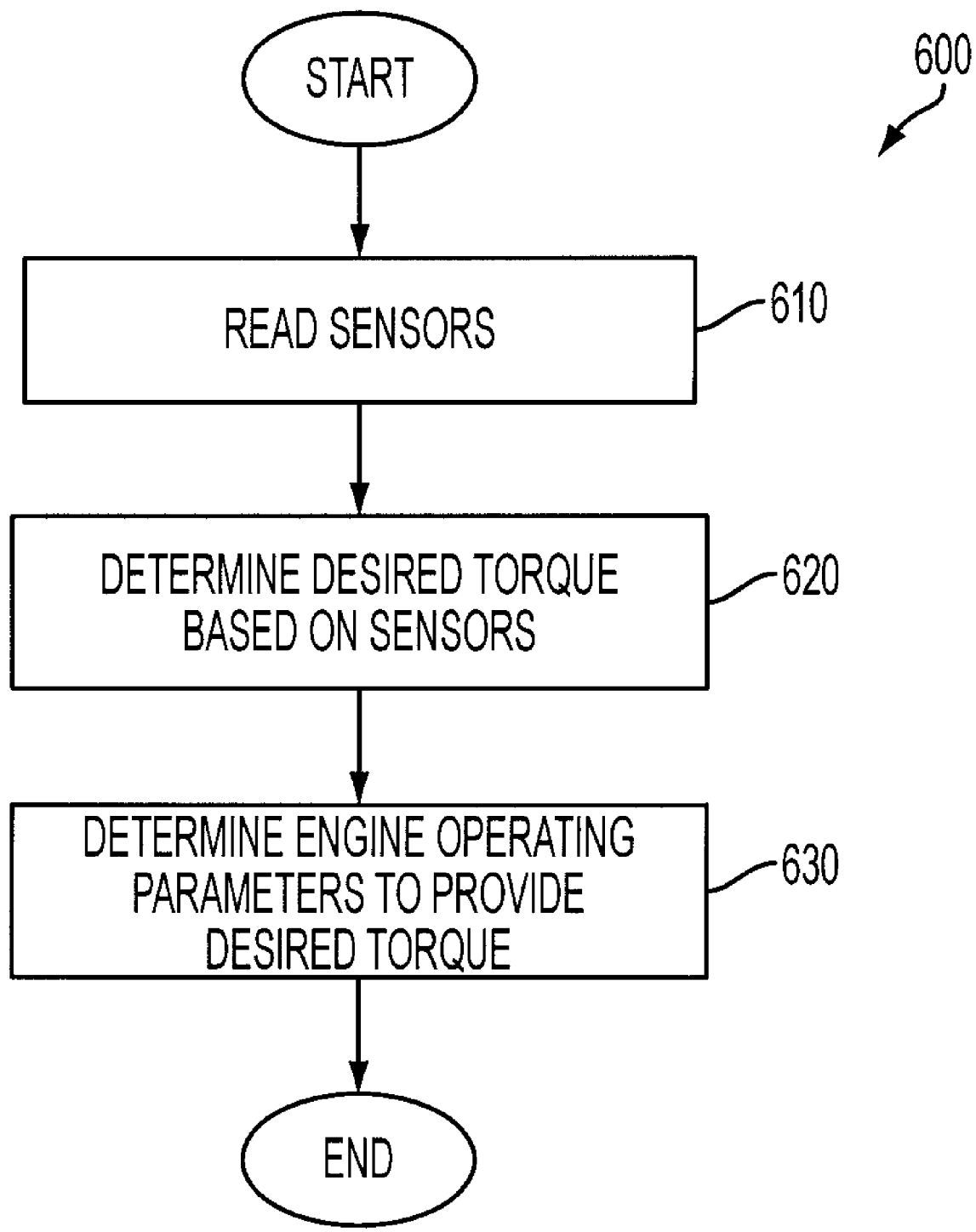
FIG. 6 shows a flow chart illustrating the process sequence of the engine.

Referring now to FIG. 6, a routine 600 is described for determining desired engine operation parameters in response to the fuel composition and driver demand to control engine and/or powertrain torque. In particular, routine 600 adjusts the torque of an engine to compensate for variations in fuel composition.

Specifically, in 610, routine 600 reads various engine and operating condition input sensors and parameters, such as engine speed, pedal position, mass airflow sensor (MAF), fuel alcohol content, etc. Then, in 620, the read values may be used to calculate the desired torque. And then, in 630 the routine determines various settings for engine and/or powertrain actuators to provide the desired torque. Additional details of one example approach for providing torque control are provided with regard to FIG. 7.

Figure 7:
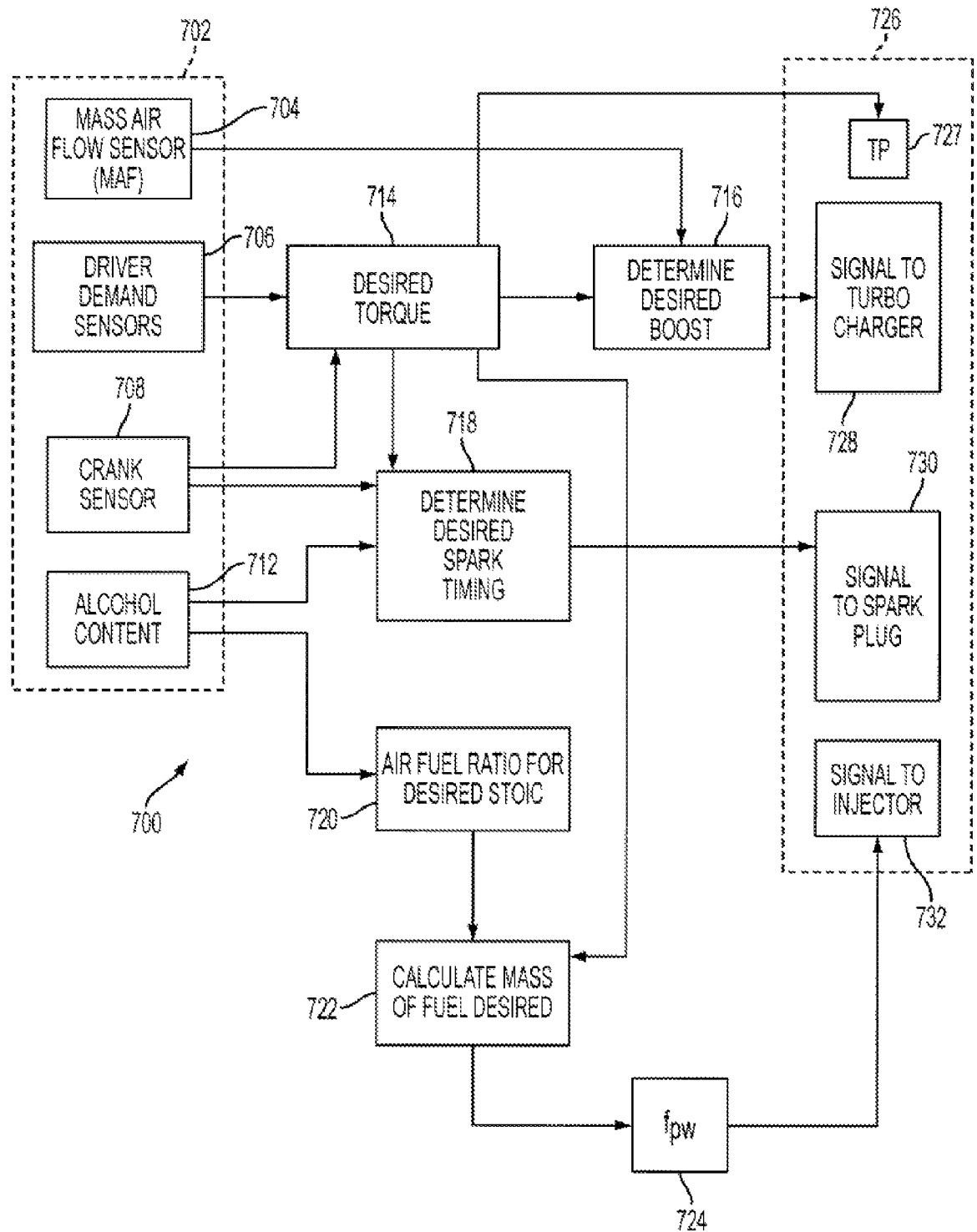
FIG. 7 shows a flow chart schematically showing how the operating parameters are determined.

Referring now to FIG. 7, a routine 700 is illustrated schematically for determining various engine operating parameters in response to input values in order to provide torque control. Input parameters are shown generally at 702 and processed to generate the desired outputs shown generally at 726.

Inputs 702 may include MAF 704, driver demand sensors 706 (e.g., pedal position detector, gear detector, etc.), crank angle sensor 708, and alcohol content (such as via a sensor 712 or an estimate based on other sensors) as well as other parameters.

In one embodiment, routine 700 may be used to determine a desired torque at 714. For example, desired torque may be a desired engine torque determined as a function of fuel composition and/or engine speed and/or driver demand. Specifically, desired torque 714 may be determined in response to values from the crank angle sensor 708 and driver demand sensors 706. Alternatively, the routine may determined a desired wheel torque based on driver demand, vehicle speed, and gear ratio, for example. The desired wheel torque, along with gear ratio and other parameters may then be translated into a desired engine torque.

Further, in the example where the peak torque, or torque range, of the engine varies with the alcohol content of the fuel, the desired torque is also based on the amount of alcohol in the fuel. For example, the driver demand may be scaled by the alcohol content so that maximum pedal position may correspond to maximum torque, even as the alcohol content varies and the maximum torque output varies. In this way, the vehicle operator is able to obtain peak engine torque from the vehicle under a variety of operating conditions, such as variable alcohol content of the fuel.

Continuing with FIG. 7, from the desired torque, the routine also determines various control settings, such as spark timing in 718 (which is used to control the spark plug in 730), desired boost in 716 (which is then used to control the turbocharger adjustment in 728) and desired throttle position in 727. Further, the routine also identifies the stoichiometric air-fuel ratio of the fuel blend, which then may be used as the desired air-fuel ratio for feedback control in 720. For example, from the desired air-fuel ratio, a desired fuel mass is determined in 722 and then used to adjust the fuel pulse width of the injector 724, along with feedback from an exhaust gas oxygen sensor.

Figure 8:
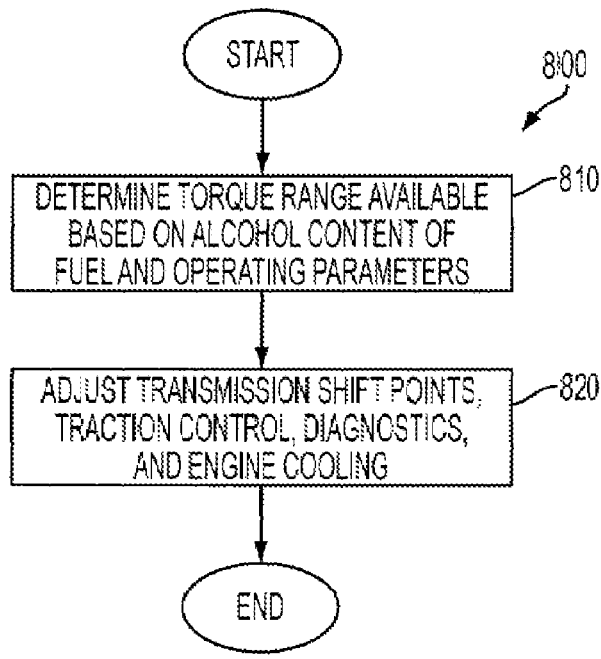
FIG. 8 shows a process control flow chart illustrating how the transmission and cooling system are governed by torque, speed, and the pedal position.

Referring now to FIG. 8, a routine 800 is described for controlling vehicle operation to accommodate an engine with a variable torque range (such as via a variable peak torque output) that can vary with an amount of alcohol in the fuel. Specifically, in 810, the routine determines the current torque range available based on the alcohol content of the fuel and operating conditions. Based on the torque range, various adjustments may be performed in 820, such as:

adjustment of transmission shift points or other transmission operation (such as torque converter lock-up, and or clutch pressure levels and/or profiles) to provide appropriate gear selection, transmission performance, and engine torque output (for example, transmission shifting may occur at different pedal positions to accommodate increased torque output as an amount of alcohol in the fuel is increased).

adjustment of traction control or other vehicle stability control (such as spark suppression, reduction of fuel supply, braking the wheels, and/or closing the throttle) to prevent loss of control of the vehicle when excessive throttle or steering is applied by the driver.

adjustment of diagnostics (such as throttle closure, engine overheating, etc.) to check for engine component failures.

adjustment of engine cooling (such as active air cooling and/or liquid cooling) to redirect waste heat energy from the engine, where cooling flow, fan speed, or various others may be adjusted.

Controlling vehicle operation based on these adjustments may facilitate engine operation at high levels of efficiency and improved performance.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. As another example, various other mechanisms may be used in a system using two different valve profiles for each of the valves in a cylinder, and the selective deactivation of one or more valves to provide the correct flow conditions for compression or auto-ignition combustion. The subject matter of the present disclosure includes all novel and nonobvious combinations and subcombinations of the various systems and configurations, and other features, functions, and/or properties disclosed herein.

Figure 9:
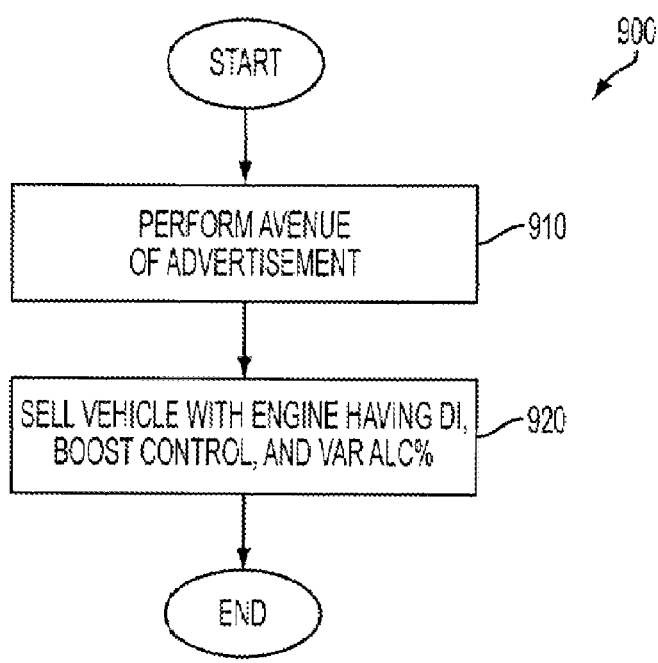
FIGS. 9-10 show flow charts outlining an example advertising and marketing strategy to sell a vehicle with various engine features.

FIG. 9 schematically demonstrates a marketing approach 900 for promoting the sale of a vehicle containing an engine capable of operating on a plurality of fuel blends and/or mixtures, such as a flex fuel vehicle having an engine with one or more of the above features described herein. In particular, marketing approach 900 promotes an engine and/or vehicle containing such an engine that may be capable of higher peak engine output torque when operated with increased amounts of alcohol in the fuel compared with gasoline.

In 910, various avenues of advertisement may be used to promote the engine. Avenues may include a plurality of media forms, such as but not limited to television, print, news, radio, internet, etc. Advertisements may be targeted towards various audiences such as environmentally conscientious consumers, for example, who also are in need of a vehicle with high towing capacity, high peak torque, etc. Advertisements may have a marketing focus. In one example, advertisements may draw attention to higher torque values available when using a fuel having increased alcohol. In another example, advertisements may draw attention to emissions of such an engine when using a fuel having increased alcohol. In still another example, advertisements may draw attention to increased fuel economy available when using a fuel having increased alcohol. In yet another example, advertisements may draw attention to the ability of the vehicle to operate with varying levels of alcohol in the fuel, including gasoline without additional alcohol. For example, the marketing strategy may advertise how improved knock reduction with alcohol-containing fuels, along with boosting, enables improved vehicle range even when using alcohol-containing fuels. And, combinations of the above may also be used.

In 920, a vehicle with an engine capable of utilizing alcohol based fuel to achieve improved performance compared with gasoline is sold. It may be emphasized that the engine may have a combination of properties that allow for a higher torque with the use of alcohol in the fuel. For example, specification sheets may describe direct injection, variable boosting, adjustable spark timing, etc.

Figure 10:
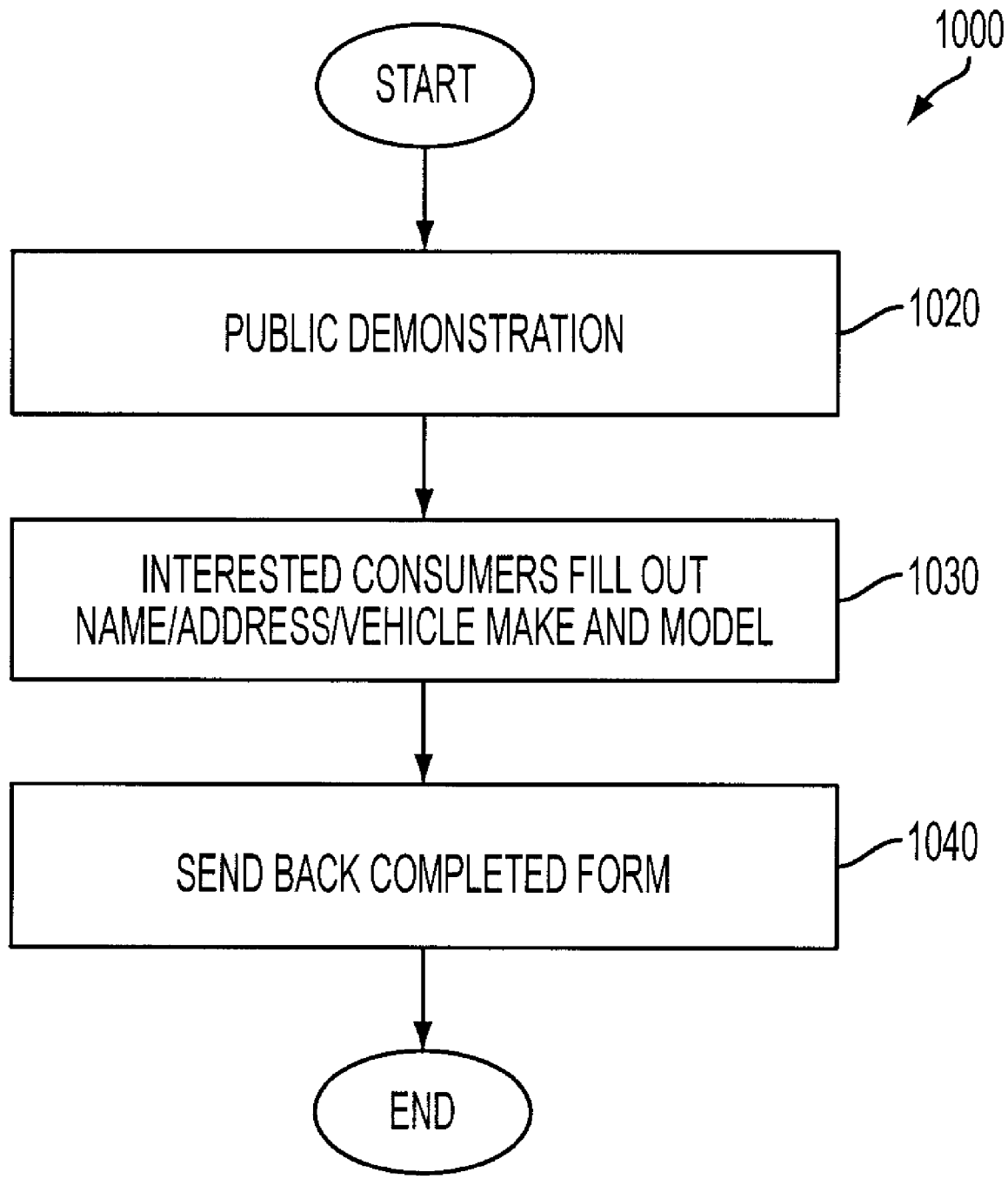

Referring now to FIG. 10, a routine 1000 describes one embodiment of a marketing strategy to sell a vehicle with a flexible fuel engine.

In 1020, a public demonstration may be organized to allow public viewing of a vehicle operating on flexible fuels. A public demonstration may occur at a car show, for example. In another example, the engine may be demonstrated in an alternative energy symposium or conference. In yet another example, a demonstration may occur in a community venue, such as a mall. A plurality of concepts may be demonstrated by the vehicle. For example, a monitor may demonstrate torque produced by the engine. Further, torque may be monitored while fuel composition is also monitored.

Proceeding with FIG. 10, in 1030, interested consumers may fill out an information card for further contact. The card may contain personal information such as address, phone number, email address, etc. In one embodiment, the information card may include the vehicle owners make and model. In another embodiment, the information card may include demographics, such as age, race, gender, etc.

In 1040, a comparative report may be sent to the interested consumer. The report may include information such as price, fuel economy, maximum torque with varying alcohol content, and/or emissions comparisons. The interested consumer thereby has further access to information about flex fuel vehicles. Further, the seller may have contact information from an interested consumer for future events.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A system for an engine having at least a cylinder and combusting a fuel, the system comprising:
    a fuel system including a sole fuel tank holding a fuel with variable alcohol content;
    a direct injection fuel injector coupled to the cylinder, the direct injection fuel injector coupled to the sole fuel tank and delivering said fuel with variable alcohol content to said cylinder;
    an intake charge boosting device coupled to the engine and fluidly coupled to the cylinder; and
    a control system for varying at least a spark timing of the cylinder and boost amount of said intake charge boosting device as an alcohol content of said fuel varies, said system operating the engine to produce increased peak torque output when said alcohol content is increased, at least during one condition.

2. The system of claim 1 wherein a desired torque of said engine is based on an amount of alcohol in said fuel, said desired torque scaled by the alcohol amount so that maximum pedal position corresponds to peak torque even as peak torque output of an engine varies.

3. The system of claim 1 wherein said control system further adjusts transmission shifting in response to variation of said alcohol content of said fuel to account for said increased peak torque availability.

4. The system of claim 1 wherein said control system further adjusts engine cooling in response to variation of said alcohol content.

5. The system of claim 1 wherein said control system further adjusts traction control operation in response to variation of said variable alcohol content.

6. The system of claim 1 wherein said control system varies spark timing and boost in response to both said alcohol content and knock sensor feedback in coordination.

7. A method for combusting fuel in an engine, comprising:
    directly injecting a fuel having a varying amount of alcohol to a cylinder; and varying at least a spark timing of the cylinder and a boost amount provided to the cylinder as an alcohol content of the fuel varies, wherein a desired torque related to an accelerator position is scaled as a peak torque of the engine varies.

8. A system for an engine having at least a cylinder and combusting a fuel, the system comprising:
    a direct injection fuel injector for directly injecting said fuel to said at least a cylinder;
    an intake charge boosting device coupled to the engine and fluidly coupled to the cylinder; and
    a control system for varying at least a spark timing of the cylinder and boost amount of said device as an alcohol content of said fuel directly injected to said at least a cylinder varies, said control system operating the engine to produce increased peak torque output when said alcohol content is increased, at least during one condition, where a boost amount is increased and a spark timing is advanced with increased alcohol content of said fuel for at least said one condition compared with lower alcohol content operation.

9. The system of claim 8 wherein said control system determines alcohol content of said fuel based on at least exhaust gas sensor information.

10. The system of claim 8 wherein a desired torque of said engine is based on an amount of alcohol in said fuel, said desired torque scaled by the alcohol amount so that maximum pedal position corresponds to peak torque even as peak torque output of the engine varies.

11. The system of claim 8 wherein said control system further adjusts transmission shifting in response to variation of said alcohol content to account for said increased peak torque availability.

12. The system of claim 8 wherein said control system further adjusts engine cooling in response to variation of said alcohol content.

13. The system of claim 8 wherein said control system further adjusts traction control operation in response to variation of said alcohol content.

* * * * *